United States Patent [19]
Arnett

[11] 3,880,317
[45] Apr. 29, 1975

[54] INLET INSERT

[75] Inventor: Lawrence E. Arnett, Wayne, Mich.

[73] Assignee: Ford Motor Company, Dearborn, Mich.

[22] Filed: Mar. 2, 1973

[21] Appl. No.: 337,514

[52] U.S. Cl.............. 220/86 R; 141/325; 141/392; 220/85 F
[51] Int. Cl........................ B65b 3/04; B65d 25/00
[58] Field of Search .......... 141/311, 312, 325, 383, 141/390–392, 59, 97, 290, 310, 367, 382, 384–388, 351; 220/86 R, 85 F; 285/27, 177

[56] References Cited
UNITED STATES PATENTS

| | | | |
|---|---|---|---|
| 2,778,390 | 1/1957 | Young | 141/392 X |
| 3,543,484 | 12/1970 | Davis | 141/286 X |
| 3,815,784 | 6/1974 | Hansel | 141/351 X |

*Primary Examiner*—Richard E. Aegerter
*Assistant Examiner*—Frederick R. Schmidt
*Attorney, Agent, or Firm*—Roger E. Erickson; Keith L. Zerschling

[57] ABSTRACT

An inlet insert to be positioned within the fuel tank inlet pipe of an automotive vehicle to prevent filling the tank with improper fuels. The insert permits full insertion of and delivery from a pump nozzle spout of a predetermined diameter or less, to be used with non-leaded fuels, and precludes full insertion of and delivery from a larger diameter pump nozzle spout, to be used with leaded fuels. The insert includes abutment means constructed to withhold the delivery end of the nozzle spout from the base of the insert thereby causing bubbling back of fuel delivered from an improper nozzle. Fuel bubbling back impinges on the automatic shutoff sensor of the nozzle to stop the fuel delivery.

11 Claims, 2 Drawing Figures

PATENTED APR 29 1975    3,880,317

3,880,317

INLET INSERT

BACKGROUND AND SUMMARY OF THE INVENTION

When catalytic converters or mufflers are used to treat the exhaust gases of internal combustion engines, means to prevent refueling with leaded fuels are desirable. Use of leaded fuels would permanently reduce or eliminate the effectiveness of the catalyst.

It has been proposed that automobile service station pumps for non-leaded fuels have smaller diameter nozzle spouts and that pumps for leaded fuels have larger diameter nozzle spouts. This invention provides an insert positionable within the inlet or filler pipe of the fuel tank of an automobile which accepts the smaller diameter nozzle spout but which does not accept the larger diameter spout. Also, this invention provides an insert which cooperates with the automatic shut off mechanism of a fuel pump nozzle to prevent unintentional delivery of significant quantities of leaded fuel delivered through nozzle spouts of a larger diameter and which notifies the fuel pump operator of an attempt to deliver improper fuel. Further, this invention provides means to discourage the intentional filling of fuel tank with leaded fuel delivered through a larger diameter nozzle spout. The invention also provides a construction which is economical to produce and install and which is reliable and effective in operation.

An insert constructed in accordance with this invention includes a member positioned within the mouth of the inlet pipe of a storage container or tank. The insert includes an end portion with an opening or orifice constructed to accept a nozzle spout of a dimension of a predetermined magnitude or less and to reject a nozzle spout of a dimension greater than the predetermined magnitude. The insert member includes abutment means engagable with the delivery end of a nozzle spout having a dimension greater than the predetermined magnitude which prevents the delivery end of a nozzle spout from bottoming against the end portion of the insert member and which maintains the delivery end of the nozzle spout in a position spaced from the end portion. One of several suitable abutment means comprises ramp members or grommets positioned upstream of the end portion.

DETAILED DESCRIPTION OF A PREFERRED EMBODIMENT

Figure 1:
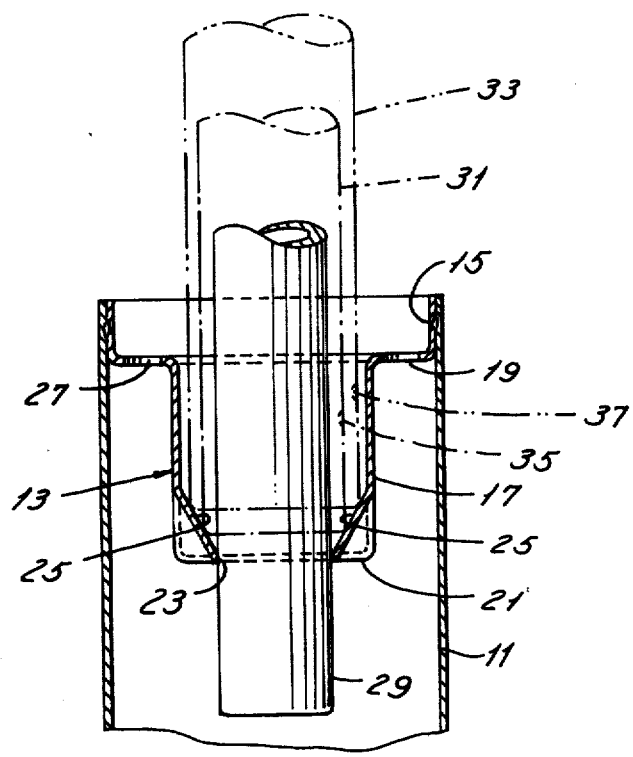
FIG. 1 is an axial cross sectional view of an inlet pipe and insert member constructed in accordance with this invention. Nozzle spouts of varying diameters are illustrated by solid or broken lines.
Figure 2:
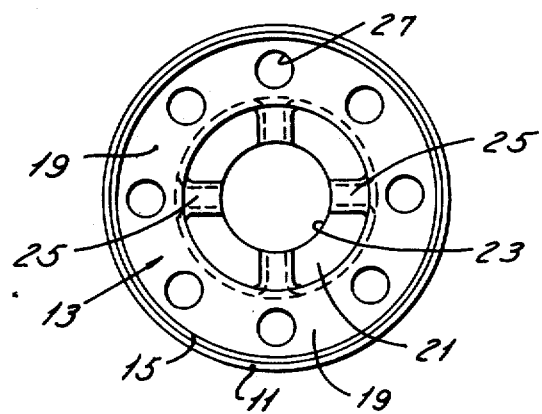
FIG. 2 is an end elevational view of an insert member viewed in a downstream direction or, alternatively stated, viewed looking into the mouth of an inlet.

Reference numeral 11 designates an inlet filler pipe for an automotive vehicle fuel tank or other storage container. Secured to the mouth of the filler pipe is an insert or cup member 13. The insert includes a first generally cylindrical portion 15 having an outer diameter essentially equal to the inner diameter of the mouth of filler pipe 11. The insert may be welded to the filler pipe along the portion 15. The insert includes a reduced diameter second cylindrical portion 17 extending downstream or into the filler pipe 11 from an annular intermediate portion 19. The downstream end of the second cylindrical wall portion is partially closed by end portion 21 having an opening or orifice 23 formed therein. The opening may be circular as shown, oval or any other shape suitable to receive a nozzle spout of generally circular cross-section. It has been found that a slightly out-of-round orifice 23 facilitates the entry and withdrawal of a circular nozzle spout and is less prone to binding than a circular orifice.

A plurality of ramp means or gussets 25 are disposed about the orifice 23 inclined between the end portion 21 and the second cylindrical wall portion 17 of the insert. The bottoms of the gussets or ramps terminate at the periphery of the orifice. A plurality of vent openings 17 are formed in the intermediate portion 19.

The insert or cup member 13 is designed for use in cooperation with pumps having nozzle spouts with diameters corresponding to the type of fuel delivered by that pump. The insert permits the full insertion of a nozzle spout 29 of a diameter equal to or less than the diameter or other critical cross sectional dimension of orifice 23. Such a nozzle spout is used to deliver non-leaded fuel to a vehicle having a catalytic converter. The insert does not interfere in any way with delivery of fuel from nozzle spout 29 and the ramp means 25 aid in guiding the nozzle spout into the orifice 23.

Pumps delivering leaded fuel are equipped with nozzle spouts of diameters larger than the minimum cross sectional dimension of orifice 23, illustrated by broken line representations 31 and 33. When a nozzle spout 31 or 33 is attempted to be inserted into the filler pipe 11 and through insert 13, the delivery end of the nozzle spout engages the ramp means 25 and entry of the spout into the orifice 23 is prevented. The delivery end of nozzle spout 31 or 33 will be spaced from the end portion 21 of the insert a distance depending upon the diameter of the oversize nozzle spout as shown in FIG. 1. When fuel is attempted to be delivered from an oversize nozzle spout 31 or 33, the laminar flow from the spout is disturbed by the ramp means 25 and end portion 21 causing turbulence and bubbling back which, in turn, fills the cup formed by the end 21 and the second cylindrical wall portion 17. The fuel then impinges on the conventional automatic nozzle shut-off sensor 35 or 37 causing the fuel flow to terminate. The length of the cylindrical wall portion 17 must be sufficient to fully receive the sensor 35 or 37 irrespective of the nozzle spout diameter.

From the foregoing it may be seen that in combination with nozzle spouts of predetermined diameters for particular fuels the insert 13 provides means to prevent the unintended filling of a fuel tank of an automobile equipped with a catalytic converter with leaded fuels. Furthermore, the insert 13 provides means to discourage and to render painstaking and tedious the intentional filling with leaded fuels.

Modifications and alterations will occur to those skilled in the art that are included within the scope of the following claims.

I claim:

1. A device to reject a nozzle spout having a maximum cross-sectional dimension greater than a predetermined magnitude and to accept a nozzle spout having a maximum cross-sectional dimension equal to or less than the predetermined magnitude, said device comprising a member positioned within an inlet of a container including a wall portion extending generally in the axial direction of the inlet and a substantially perpendicular downstream partially closed end portion having an opening having a cross-sectional dimension equal to a predetermined magnitude therein constructed to accept a nozzle spout of a maximum cross-sectional dimension of said predetermined magnitude or less and to reject a nozzle spout of a maximum cross-sectional dimension greater than said predetermined magnitude, said member including spaced abutment means protruding from said wall portion upstream of said end portion and being axially engageable with the delivery end of a nozzle spout of a dimension greater than said predetermined magnitude to prevent said delivery end from axially engaging said end portion and to maintain said delivery end in a position spaced upstream from said end portion.

2. Means according to claim 1,
said abutment means comprising at least one ramp member positioned upstream of said end portion.

3. Means according to claim 1,
said abutment means comprising a plurality of ramp members disposed about said opening and extending upstream from the periphery of said opening,
said ramp members providing a means to guide a nozzle spout of a diameter equal to or less than said predetermined magnitude into said opening.

4. An inlet pipe insert for a storage container constructed to selectively accept and reject pump nozzle spouts on the basis of outer diameter magnitude, said insert comprising:
a cup member secured within an inlet pipe,
said cup member including a wall portion extending axially inwardly into said inlet pipe and
a downstream partially closed end portion joining said wall portion and being substantially perpendicular thereto,
an orifice having a cross-sectional dimension equal to a predetermined magnitude formed in said end portion of said cup member,
spaces abutment means protruding from said wall portion upstream of said end portion and being axially engageable with the delivery end of a nozzle spout of a diameter greater than said predetermined magnitude to prevent engagement between the just-mentioned nozzle spout and said end portion of said cup member and to maintain the delivery end of said just-mentioned nozzle spout in a position spaced upstream from said end portion.

5. An insert according to claim 4,
said abutment means comprising at least one ramp member extending inwardly from said wall portion of said cup member toward said end portion.

6. An insert according to claim 4,
said abutment means comprising a plurality of ramp members extending inwardly from said wall portion to said end portion,
said ramp members terminating at the periphery of said orifice formed in said end portion,
said ramp members providing means to guide a nozzle spout of a diameter equal to or less than said predetermined magnitude into said orifice.

7. An insert according to claim 4 usable in cooperation with a nozzle having an automatic shutoff sensor located on the nozzle spout at a position spaced from the delivery end of said spout,
said cup member having a depth sufficient to receive within said wall portion the automatic shut-off sensor of such a nozzle having a spout of a diameter greater than said predetermined magnitude.

8. An insert according to claim 4,
vent means formed in an upstream portion of said cup member.

9. A liquid storage tank inlet pipe insert constructed to selectively accept and reject pump nozzle spouts on the basis of outer diameter magnitude, said insert comprising:
a cup member including a first portion secured to an inlet pipe,
an axially extending cylindrical wall portion of a diameter smaller than that of the inlet pipe, said cylindrical wall portion having an upstream end and a downstream end,
an intermediate portion joining said first portion and the upstream end of said cylindrical wall portion,
an end portion joining said cylindrical wall portion at the downstream end thereof,
an orifice having a cross-sectional dimension equal to a predetermined magnitude formed in said end portion to receive nozzle spouts having diameters equal to or less than said predetermined magnitude,
vent means independent of said orifice formed in said intermediate portion,
spaced abutment means upstream of said end portion and protruding radially inwardly from said cylindrical wall, said abutment means being axially engageable with the delivery end of a nozzle spout of a diameter greater than said predetermined magnitude and defining an obstruction to said justmentioned nozzle spout to prevent insertion thereof into said orifice and to maintain the delivery end of said just-mentioned nozzle spout axially spaced from said end portion.

10. An insert according to claim 9,
said abutment means comprising at least one ramp member extending inwardly from said cylindrical wall portion toward said end portion.

11. An insert according to claim 9,
said abutment means comprising a plurality of ramp members extending inwardly from said cylindrical wall portion toward said end portion,
said ramp members terminating at the periphery of said orifice,
said ramp members providing means to guide a nozzle spout of a diameter equal to or less than said predetermined magnitude into said orifice.

* * * * *